US010719264B2

(12) United States Patent
Kim

(10) Patent No.: US 10,719,264 B2
(45) Date of Patent: Jul. 21, 2020

(54) SOLID STATE DRIVE DEVICE AND STORAGE SYSTEM HAVING THE SAME

(71) Applicant: Samsung Electronics Co., Ltd., Suwon-si (KR)

(72) Inventor: Min-Uk Kim, Incheon (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 12 days.

(21) Appl. No.: 15/796,903

(22) Filed: Oct. 30, 2017

(65) Prior Publication Data

US 2018/0129453 A1 May 10, 2018

(30) Foreign Application Priority Data

Nov. 10, 2016 (KR) .................. 10-2016-0149802

(51) Int. Cl.
*G06F 3/06* (2006.01)
(52) U.S. Cl.
CPC ............ *G06F 3/0659* (2013.01); *G06F 3/061* (2013.01); *G06F 3/0604* (2013.01); *G06F 3/0679* (2013.01)
(58) Field of Classification Search
CPC ...... G06F 3/0659; G06F 3/061; G06F 3/0679; G06F 3/0604
See application file for complete search history.

(56) References Cited

U.S. PATENT DOCUMENTS

| 7,539,754 | B2 | 5/2009 | Chambliss et al. |
| 7,734,783 | B1 | 6/2010 | Bourke et al. |
| 8,447,920 | B1 * | 5/2013 | Syu ................ G06F 12/0246 365/189.03 |
| 8,832,706 | B2 | 9/2014 | Gokhale et al. |
| 8,943,186 | B2 | 1/2015 | Devarakonda et al. |
| 9,940,024 | B1 * | 4/2018 | Aharoni ................ G06F 3/061 |
| 2008/0052446 | A1 * | 2/2008 | Lasser ................ G06F 12/0246 711/103 |
| 2010/0185768 | A1 | 7/2010 | Hamedany et al. |
| 2011/0179132 | A1 | 7/2011 | Mayo et al. |
| 2015/0006734 | A1 | 1/2015 | Parikh et al. |
| 2015/0074337 | A1 | 3/2015 | Jo et al. |
| 2016/0231948 | A1 * | 8/2016 | Gupta ................... G06F 3/0653 |
| 2016/0313943 | A1 * | 10/2016 | Hashimoto ............. G06F 3/061 |
| 2017/0235488 | A1 * | 8/2017 | Call ...................... G06F 3/0644 711/103 |
| 2018/0373431 | A1 * | 12/2018 | Kathawala .............. G06F 3/064 |

OTHER PUBLICATIONS

Kang, Jeong-Uk, et al. "A superblock-based flash translation layer for NAND flash memory." Proceedings of the 6th ACM & IEEE International conference on Embedded software. ACM, 2006. (Year: 2006).*

* cited by examiner

*Primary Examiner* — Francisco A Grullon
(74) *Attorney, Agent, or Firm* — Muir Patent Law, PLLC

(57) ABSTRACT

A solid state drive (SSD) device includes a plurality of nonvolatile memory devices and a SSD controller. The SSD controller is configured to allocate a resource of the SSD device based on workloads of a plurality of streams and to control operations of the nonvolatile memory devices. Accordingly, the resources of the SSD device are adjusted according to the workloads of the streams so that the SSD device may support a multi stream system with reducing performance deterioration.

20 Claims, 14 Drawing Sheets

FIG. 7A

| STREAM ID | WORKLOAD(%) | ALLOCATED WAY | EXPECTED PERFOMANCE |
|---|---|---|---|
| 1 | 10 | 2 | 76 |
| 2 | 3 | 2 | 22.8 |
| 3 | 25 | 2 | 190 |
| 4 | 50 | 2 | 380 |
| 5 | 2 | 2 | 15.2 |
| 6 | 5 | 2 | 38 |
| 7 | 1 | 2 | 7.6 |
| 8 | 1 | 2 | 7.6 |
| 9 | 3 | 2 | 22.8 |
| TOTAL | 100 | 18 | 760 |

FIG. 8A

| STREAM ID | WORKLOAD(%) | ALLOCATED WAY | EXPECTED PERFOMANCE |
|---|---|---|---|
| 1 | 10 | 2 | 76 |
| 2 | 3 | 2→1 | 18.9 |
| 3 | 25 | 2 | 190 |
| 4 | 50 | 2→8 | 505 |
| 5 | 2 | 2→1 | 12.6 |
| 6 | 5 | 2→1 | 31.5 |
| 7 | 1 | 2→1 | 6.3 |
| 8 | 1 | 2→1 | 6.3 |
| 9 | 3 | 2→1 | 18.9 |
| TOTAL | 100 | 18 | 760→865.5 |

FIG. 9

| ALLOCATED WAY | 1 | 2 | 3 | 4 | 5 | 6 | 7 | 8 |
|---|---|---|---|---|---|---|---|---|
| RESOURCE | 10 | 20 | 30 | 40 | 50 | 60 | 70 | 80 |

FIG. 10

| NUMBER OF CHANNEL | 2 | 4 | 6 | 8 | 10 | 12 | 14 | 16 |
|---|---|---|---|---|---|---|---|---|
| RESOURCE | 10 | 20 | 30 | 40 | 50 | 60 | 70 | 80 |

SOLID STATE DRIVE DEVICE AND STORAGE SYSTEM HAVING THE SAME

CROSS-REFERENCE TO RELATED APPLICATION(S)

This application claims priority under 35 U.S.C. § 119 to Korean Patent Application No. 10-2016-0149802, filed on Nov. 10, 2016, in the Korean Intellectual Property Office (KIPO), the contents of which are herein incorporated by reference in their entirety.

BACKGROUND

1. Technical Field

Exemplary embodiments relate to a storage device, and more particularly to a solid state drive (SSD) device and a storage system including the SSD device.

2. Description of the Related Art

A hard disk drive (HDD) device is typically used as a data storage mechanism of an electronic device. Recently, solid state drive (SSD) devices including nonvolatile memory devices, such as flash memories, are being used instead of HDD devices as the data storage mechanisms of electronic devices.

In addition, the SSD devices have been adapted to support a multi stream system. To support the multi stream system in the SSD device having limited resources, the resources may be divided for the streams. When workloads of the streams are varied, performance of the stream having the relatively high workload may be deteriorated.

SUMMARY

Some exemplary embodiments are directed to provide a solid state drive (SSD) device capable of supporting a multi stream system with reducing performance deterioration.

In some embodiments, the disclosure is directed to a solid state drive (SSD) device comprising: a plurality of nonvolatile memory devices; and an SSD controller configured to calculate workloads for each of a plurality of streams, allocate resources of the SSD device based on the workloads calculated for each of the plurality of streams, and control operations of the nonvolatile memory devices.

In some embodiments, the disclosure is directed to a storage system comprising: a solid state drive (SSD) device configured to store data; and a host configured to provide a power voltage to the SSD device and to control an operation of the SSD device, wherein the SSD device comprises: a plurality of nonvolatile memory devices; and a SSD controller configured to allocate a resource of the SSD device based on workloads of a plurality of streams and to control operations of the nonvolatile memory devices.

In some embodiments, the disclosure is directed to a method for multi stream processing in a solid state drive (SSD) device, comprising: mapping a plurality of streams to a super block; calculating workloads for each of the plurality of the streams; and allocating resources of the SSD device based on the workloads calculated for each of the plurality of the streams, wherein the super block is a set of memory blocks corresponding to an erasing unit of a plurality of nonvolatile memory devices.

BRIEF DESCRIPTION OF THE DRAWINGS

Illustrative, non-limiting exemplary embodiments will be more clearly understood from the following detailed description in conjunction with the accompanying drawings.

FIG. 7A is a table illustrating an example of expected performance of the SSD device of FIG. 1 when the same resources are allocated to streams.

FIG. 8A is a table illustrating an example of expected performance of the SSD device of FIG. 1 when the resources are allocated to the streams according to workloads of the streams.

FIG. 9 is an example table illustrating a relationship between the resource of the SSD device of FIG. 1 and allocated ways.

FIG. 10 is an example table illustrating a relationship between the resource of the SSD device of FIG. 1 and numbers of allocated channels.

DETAILED DESCRIPTION OF THE EMBODIMENTS

Hereinafter, the exemplary embodiments will be explained in detail with reference to the accompanying drawings.

It will be understood that when an element is referred to as being "connected" or "coupled" to, or "on" another element, it can be directly connected or coupled to, or on the other element or intervening elements may be present. In contrast, when an element is referred to as being "directly connected," "directly coupled," in or "directly on" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to a connection contact (i.e., touching) unless the context indicates otherwise.

As used herein, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two device, an electrically insulative underfill or mold layer, etc.) is not electrically connected to that component. Moreover, items that are "directly electrically connected," to each other are electrically connected through one or more passive elements, such as, for example, wires, pads, internal electrical lines, through vias, etc. As such, directly electrically connected components do not include components electrically connected through active elements, such as transistors or diodes.

Figure 1:
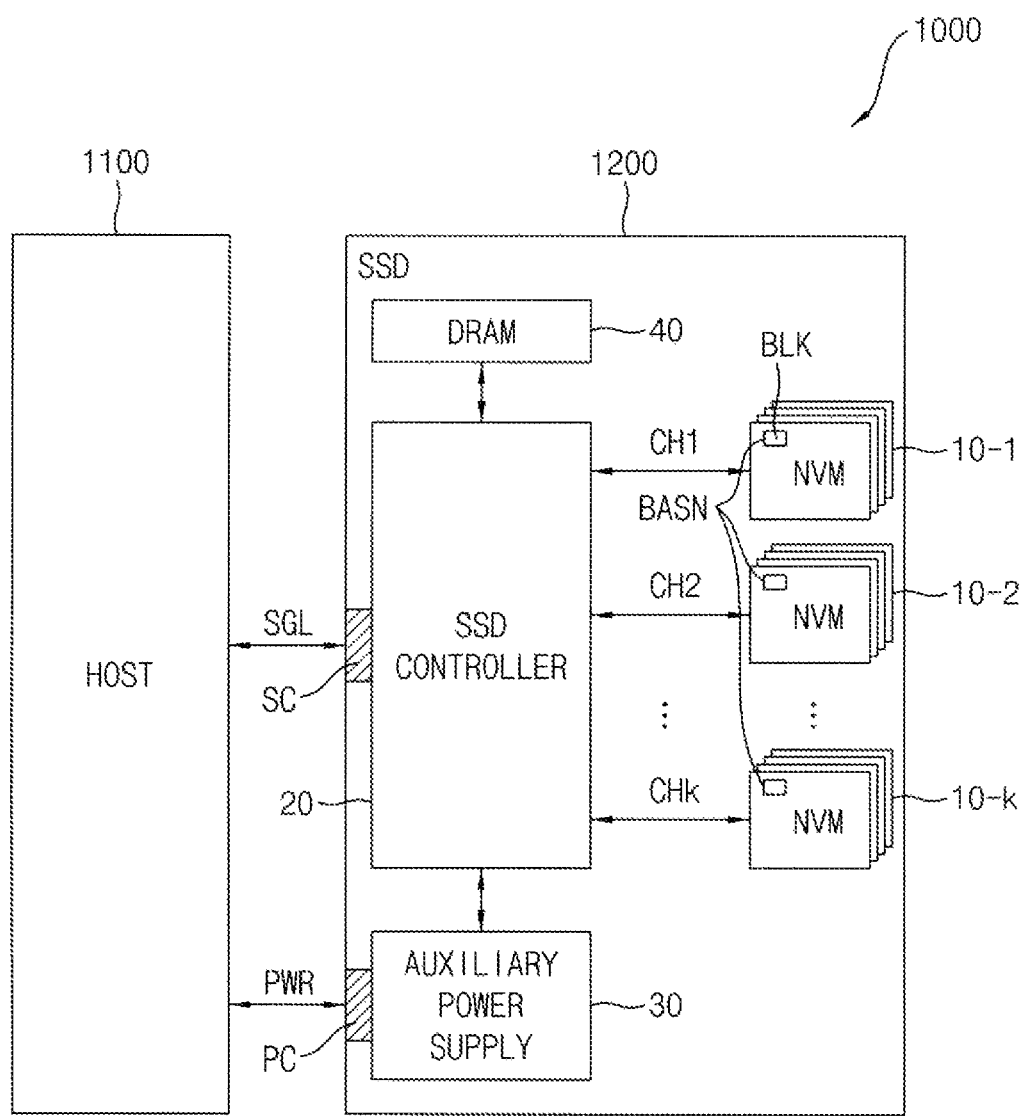
FIG. 1 is a block diagram illustrating a storage system according to an exemplary embodiment.

FIG. 1 is a block diagram illustrating a storage system according to an exemplary embodiment.

Referring to FIG. 1, a storage system 1000 includes a host 1100 and a solid state drive (SSD) device 1200.

The SSD device 1200 may include a plurality of nonvolatile memory devices 10-1, 10-2, ..., 10-$k$ and a SSD controller 20.

The nonvolatile memory (NVM) devices 10-1, 10-2, ..., 10-$k$ may be used as a storage medium of the SSD device 1200, and may be configured to store data and instructions. For example, data and instructions may be written to (stored in) the nonvolatile memory devices 10-1, 10-2, ..., 10-$k$ and read (retrieved) from the nonvolatile memory devices 10-1, 10-2, ..., 10-$k$. For example, the nonvolatile memory devices may be semiconductor chips formed from a wafer, or a semiconductor package including a package substrate, one or more semiconductor chips, and an encapsulant.

In some exemplary embodiments, each of the nonvolatile memory devices 10-1, 10-2, ..., 10-$k$ may include a flash memory device.

The SSD controller 20 may be connected to the nonvolatile memory devices 10-1, 10-2, ..., 10-$k$ by a plurality of channels CH1, CH2, ..., CH$k$, respectively. For example, the number of the channels may be sixteen. In some embodiments, each of the individual nonvolatile memory devices 10-1, 10-2, ..., 10-$k$ may be connected to the SSD controller 20 via a single channel (e.g., nonvolatile memory device 10-1 may be connected to the SSD controller 20 via channel CH1, nonvolatile memory device 10-2 may be connected to the SSD controller 20 via channel CH2, nonvolatile memory device 10-3 may be connected to the SSD controller 20 via channels CH3, etc.). However, the embodiments are not limited thereto.

A plurality of the nonvolatile memory devices may be connected to a single channel. In some embodiments, a plurality of non-volatile memory devices connected to a single channel may provide for data to be accessed (e.g., read, write, etc.) in parallel on the single channel. The number of the nonvolatile memory devices connected to the single channel may be defined as a bank or a way (e.g., a path or pathway). For example, each channel may include data ways corresponding to the number of nonvolatile memory devices connected to the single channel. In the example embodiment of FIG. 1, the illustrated nonvolatile memory devices 10-1, 10-2, ..., 10-$k$ each include four individual nonvolatile memory devices, and the number of the nonvolatile memory devices connected to each of the corresponding single channels CH1, CH2, ..., CH$k$ is four (e.g., four ways). However, the embodiments are not limited thereto. As another example, the number of the nonvolatile memory devices connected to the single channel may be eight, and the data accesses (e.g., read, write, etc.) across channel CH1 may be performed in parallel through each of the eight ways.

The SSD controller 20 may exchange a signal SGL with the host 1100 through a signal connector SC. The signal SGL may include a command, an address and data. SSD controller 20 may perform a write operation and a read operation on the nonvolatile memory devices 10-1, 10-2, ..., 10-$k$ according to the command received from the host 1100. For example, the SSD controller 20 may receive a signal SGL including a write command, an address to which to write data and data to be written, and the SSD controller 20 may write the received data to the address in accordance with the write command. As another example, the SSD controller 20 may receive a signal SGL including a read command and an address from which to retrieve data, and the SSD controller 20 may retrieve the data stored in the identified address in accordance with the read command.

The SSD device 1200 may further include an auxiliary power supply 30. The auxiliary power supply 30 may receive power PWR from the host 1100 through a power connector PC and provide power to the SSD controller 20.

The auxiliary power supply 30 may be placed inside or outside the SSD device 1200. For example, the auxiliary power supply 30 may be placed in a main board and provide auxiliary power to the SSD device 1200.

The SSD device 1200 may further include a volatile memory device 40. The volatile memory device 40 may function as an input/output (I/O) buffer of the SSD controller 20. For example, in a write operation mode, the SSD controller 20 may store data received from the host 1100 to the volatile memory device 40 and may write the data stored in the volatile memory device 40 to the nonvolatile memory devices 10-1, 10-2, ..., 10-$k$. In addition, in a read operation mode, the SSD controller 20 may store the data read out from the nonvolatile memory devices 10-1, 10-2, ..., 10-$k$ to the volatile memory device 40 and may provide the data stored in the volatile memory device 40 to the host 1100. For example, the volatile memory device may be one or more semiconductor chips formed from a wafer, or a semiconductor package including a package substrate, one or more semiconductor chips, and an encapsulant.

In some exemplary embodiments, the volatile memory device 40 may include a dynamic random access memory (DRAM) device.

In some exemplary embodiments, each of the nonvolatile memory devices 10-1, 10-2, ..., 10-$k$ may include a plurality of memory blocks BLK.

The memory blocks BLK of the nonvolatile memory devices 10-1, 10-2, ..., 10-$k$ may form a single super block BASN. The super block BASN may be a set of the blocks BLK which corresponds to an erasing unit of the nonvolatile memory devices 10-1, 10-2, ..., 10-$k$. For example, the super block BASN may be a set of the blocks BLK which are connected to different channels CH1, CH2, ..., CH$k$.

The SSD controller 20 maps the stream and the super block BASN. When the SSD device 1200 supports a multi stream system, SSD controller 20 may map respective streams to different super blocks. For example, the streams and the super blocks may be mapped to each other in a one-on-one manner. Alternatively, the streams and the super blocks may be mapped to each other in a one-for-several manner or a several-for-one manner.

In addition, the SSD controller 20 may operate each of the plurality of memory blocks BLK included in the nonvolatile memory devices 10-1, 10-2, ..., 10-$k$ in one of a single level cell (SLC) mode, a multi level cell (MLC) mode, and a triple level cell (TLC) mode. The term "cell mode" may refer to storage properties of the memory cells that form the memory blocks BLK. For example, each memory block BLK includes a plurality of memory cells, and the number of bits that can be stored in each memory cell of a given memory block BLK is defined by the mode in which the memory block BLK is operating (e.g., SLC, MLC, or TLC mode).

When a memory block BLK included in the nonvolatile memory devices 10-1, 10-2, ..., 10-$k$ operates in the SLC mode, a memory cell included in the memory block BLK may store one bit of data.

When a memory block BLK included in the nonvolatile memory devices 10-1, 10-2, ..., 10-$k$ operates in the MLC mode, a memory cell included in the memory block BLK may store two bits of data.

When a memory block BLK included in the nonvolatile memory devices 10-1, 10-2, ..., 10-$k$ operates in the TLC mode, a memory cell included in the memory block BLK may store three bits of data.

The SSD controller 20 may distribute the plurality of data in the memory blocks BLK operating in the SLC mode, the memory blocks BLK operating in the MLC mode, and the memory blocks BLK operating in the TLC mode based on an access pattern for each of the plurality of data stored in the nonvolatile memory devices 10-1, 10-2, ..., 10-$k$.

An operation of the SSD controller 20 will be described in detail later.

Figure 2:
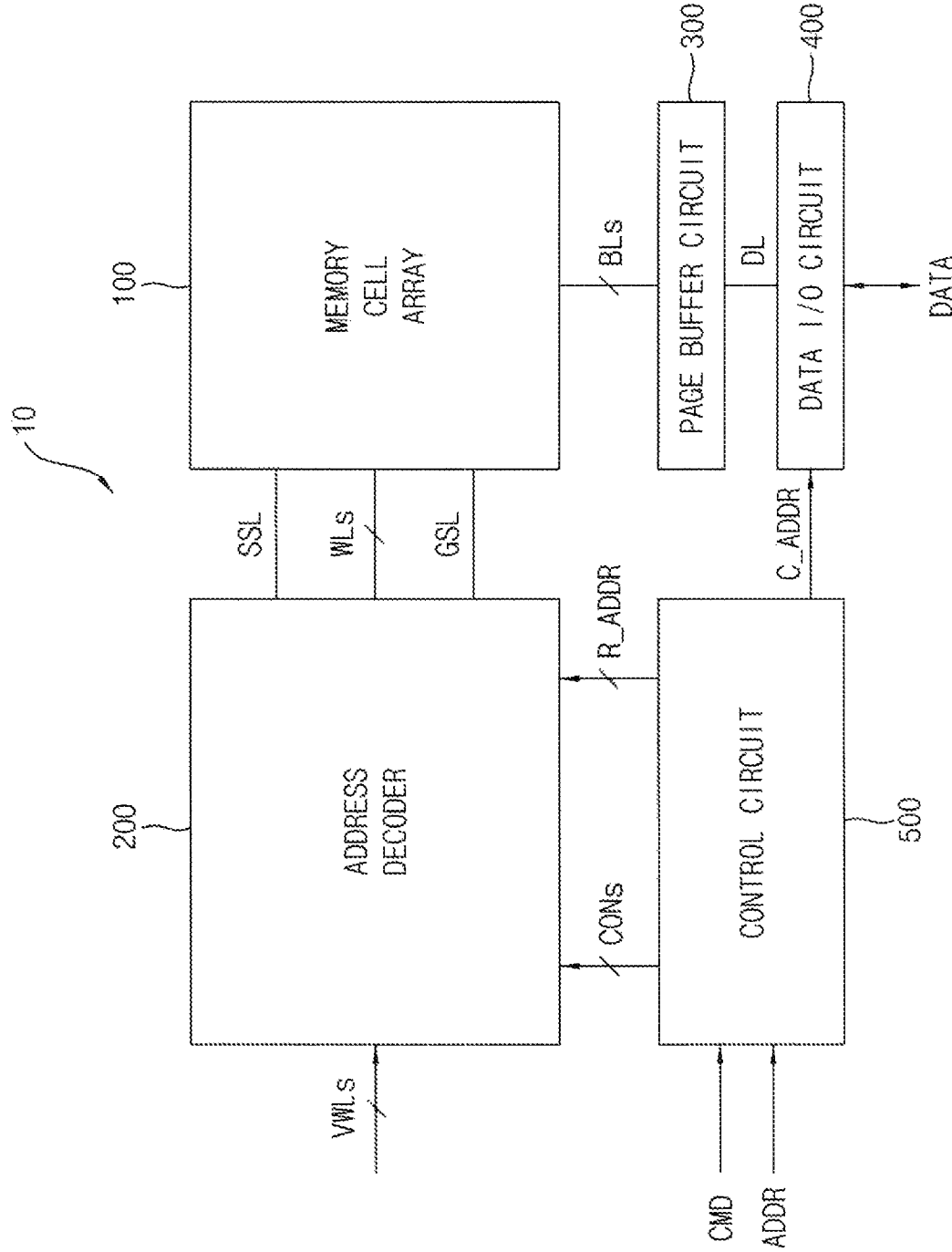
FIG. 2 is a block diagram illustrating an example of a volatile memory device included in a SSD device of FIG. 1.

FIG. 2 is a block diagram illustrating an example of a nonvolatile memory device included in a SSD device of FIG. 1.

Each of the nonvolatile memory devices 10-1, 10-2, ..., 10-$k$ included in the SSD device 1200 of FIG. 1 may be implemented with a nonvolatile memory device 10 of FIG. 2.

Referring to FIG. 2, the nonvolatile memory device 10 may include a memory cell array 100, an address decoder 200, a page buffer circuit 300, a data input/output (I/O) circuit 400 and a control circuit 500.

The memory cell array 100 may be connected to the address decoder 200 through a string selection line SSL, a plurality of word lines WLs, and a ground selection line GSL. In addition, the memory cell array 100 may be connected to the page buffer circuit 300 through a plurality of bit lines BLs.

The memory cell array 100 may include a plurality of memory blocks BLK. Each of the plurality of memory blocks BLK may include a plurality of memory cells connected to the plurality of word lines WLs and the plurality of bit lines BLs.

In some exemplary embodiments, the memory cell array 100 may be a three-dimensional memory cell array, which is formed on a substrate in a three-dimensional structure (or a vertical structure). In this case, the memory cell array 100 may include vertical cell strings that are vertically oriented such that at least one memory cell is located over another memory cell.

In some exemplary embodiments, the memory cell array 100 may be a two-dimensional memory cell array, which is formed on a substrate in a two-dimensional structure (or a horizontal structure). For example, the plurality of memory cells may be arranged in rows and columns that are connected to the plurality of word lines WLs and the plurality of bit lines BLs.

Figure 3:
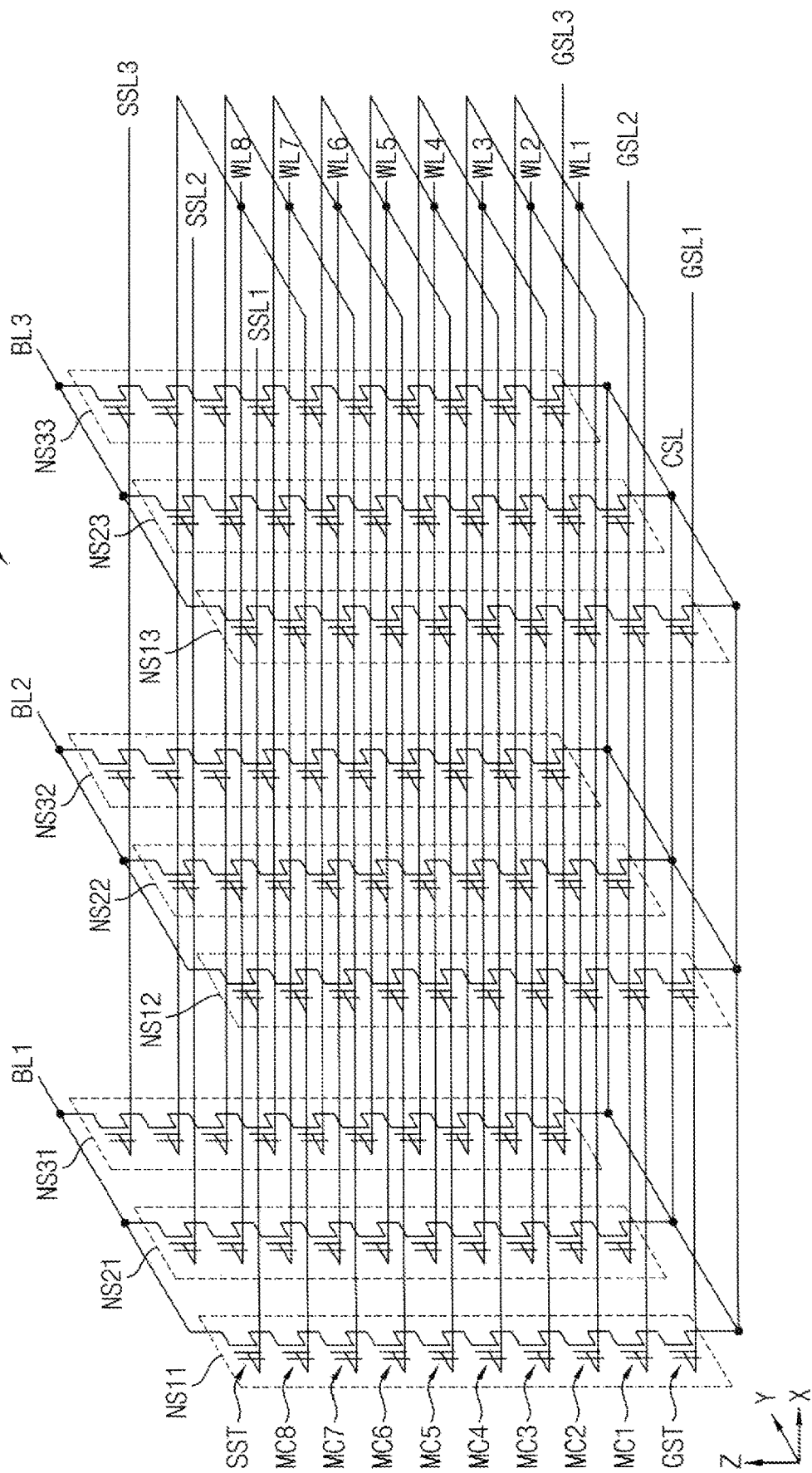
FIG. 3 is a circuit diagram illustrating an example of a memory cell array included in the nonvolatile memory device of FIG. 2.

FIG. 3 is a circuit diagram illustrating an example of a three-dimensional memory cell array 100$a$ that may be included in the nonvolatile memory device of FIG. 2.

One memory block included in the memory cell array 100$a$ is illustrated in FIG. 3.

The memory cell array 100$a$ of FIG. 3 may be formed on a substrate in a three-dimensional structure (or a vertical structure). For example, a plurality of memory cell strings included in the memory cell array 100$a$ may be arranged on a substrate (e.g., in the D1 and D2 directions), and formed to extend in a direction perpendicular to the substrate (e.g., the D3 direction).

Referring to FIG. 3, the memory cell array 100$a$ may include memory cell strings NS11 to NS33 coupled between respective bit lines BL1, BL2 and BL3 and a common source line CSL. Each of the memory cell strings NS11 to NS33 may include a string selection transistor SST, a plurality of memory cells MC1 to MC8, and a ground selection transistor GST.

In FIG. 3, each of the memory cell strings NS11 to NS33 is illustrated to include eight memory cells MC1 to MC8. However, exemplary embodiments are not limited thereto. In some exemplary embodiments, each of the memory cell strings NS11 to NS33 may include any number of memory cells.

The string selection transistor SST may be connected to a corresponding one of the string selection lines SSL1 to SSL3. The plurality of memory cells MC1 to MC8 may be connected to corresponding word lines WL1 to WL8, respectively. The ground selection transistor GST may be connected to a corresponding one of the ground selection lines GSL1 to GSL3. The string selection transistor SST may be connected to a corresponding one of the bit lines BL1, BL2 and BL3, and the ground selection transistor GST may be connected to the common source line CSL.

Word lines (e.g., WL1) having the same height may be commonly connected. For example, word lines WL1 connected to a plurality of memory cells MC1 may be connected with one another, word lines WL2 connected to a plurality of memory cells MC2 may be connected with one another, word lines WL3 connected to a plurality of memory cells MC3 may be connected with one another, etc. The ground selection lines GSL1 to GSL3 and the string selection lines SSL1 to SSL3 may be separated. For example, the ground selection lines GSL1 to GSL3 and the string selection lines SSL1 to SSL3 may be spaced apart from one another in the vertical direction by the word lines WL1 to WL8. At a first vertical level, each of the ground selection lines GSL1 to GSL3 may be separated from each other in a horizontal direction, and at a second vertical level, each of the string selection lines SSL1 to SSL3 may be separated from each other in the horizontal direction.

In FIG. 3, the memory cell array 100$a$ is illustrated to be connected to eight word lines WL1 to WL8 and three bit lines BL1 to BL3. However, exemplary embodiments are not limited thereto. In some exemplary embodiments, the memory cell array 100$a$ may be connected to any number of world lines and bit lines.

Figure 4:
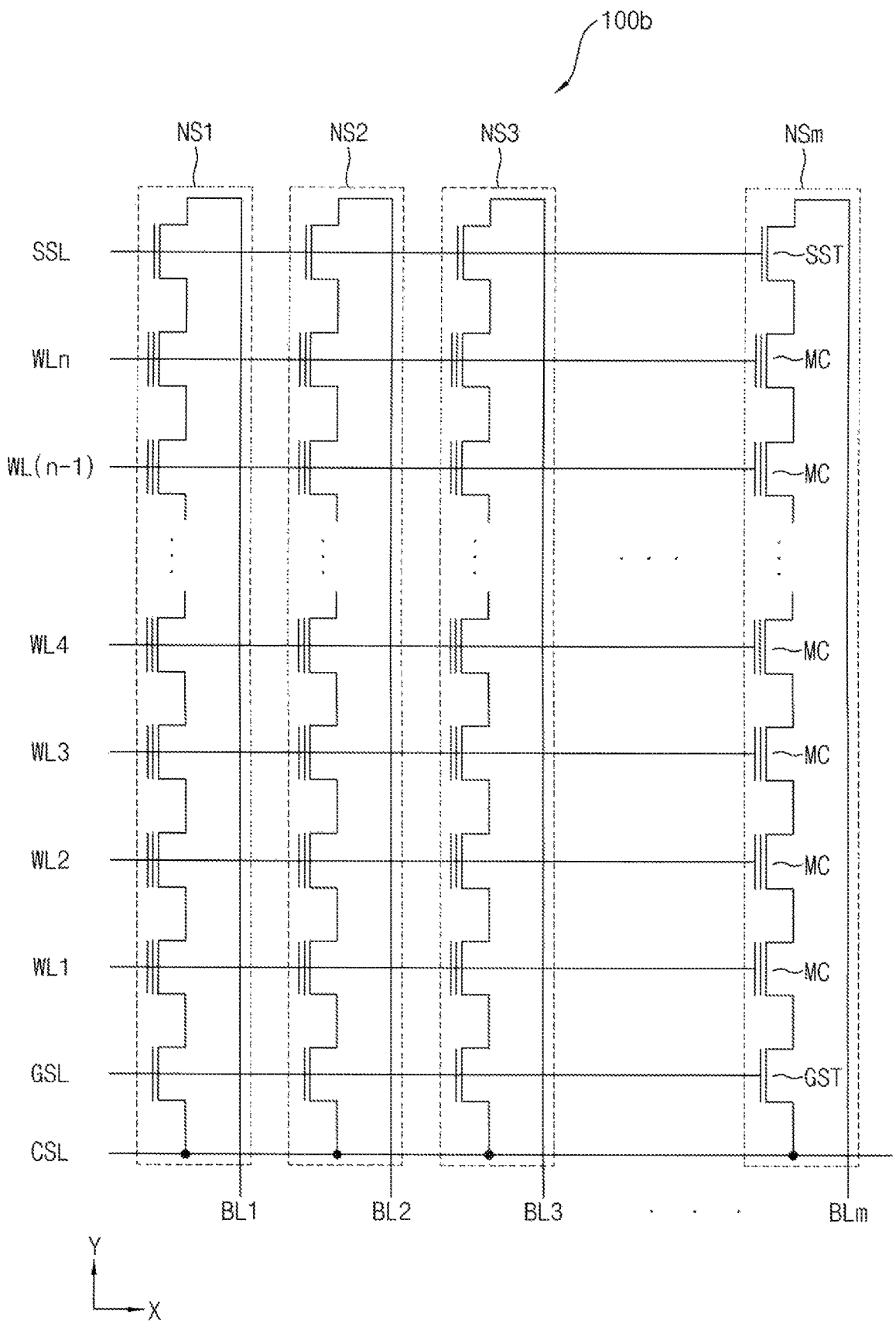
FIG. 4 is a circuit diagram illustrating an example of a memory cell array included in the nonvolatile memory device of FIG. 2.

FIG. 4 is a circuit diagram illustrating an example of a memory cell array included in the nonvolatile memory device of FIG. 2.

A memory cell array 100$b$ of FIG. 4 may be formed on a substrate in a two-dimensional structure (or a horizontal structure). For example, a plurality of memory cell strings included in the memory cell array 100$b$ may be formed in a direction parallel to the substrate (e.g., in the D1 and D2 directions).

Referring to FIG. 4, the memory cell array 100$b$ may include memory cell strings NS1, NS2, NS3, ..., NSm.

Each of the memory cell strings NS1, NS2, NS3, ..., NSm may include a string selection transistor SST, a plurality of memory cells MC, and a ground selection transistor GST that are serially connected to each other.

The string selection transistor SST included in each of the memory cell strings NS1, NS2, NS3, ..., NSm may be commonly connected to the string selection line SSL. Memory cells arranged in a same row among memory cells MC included in each of the memory cell strings NS1, NS2, NS3, ..., NSm may be commonly connected to corresponding word lines WL1, WL2, WL3, WL4, ..., WL(n−1) and WLn. The ground selection transistor GST included in each of the memory cell strings NS1, NS2, NS3, ..., NSm may be commonly connected to the ground selection line GSL.

The ground selection transistors GST included in each of the memory cell strings NS1, NS2, NS3, ..., NSm may be commonly connected to the common source line CSL.

The string selection transistor SST included in each of the memory cell strings NS1, NS2, NS3, ..., NSm may be connected to corresponding bit lines BL1, BL2, BL3, ..., BLm.

Here, n and m represent positive integers.

Referring again to FIG. 2, the control circuit 500 may receive the command signal CMD and the address signal ADDR from the SSD controller 20, and the control circuit 500 may control one or more of a write operation, a read operation, and an erase operation of the nonvolatile memory device 10 based on the command signal CMD and the address signal ADDR.

For example, the control circuit 500 may generate control signals CONs based on the command signal CMD, and generate a row address R_ADDR and a column address C_ADDR based on the address signal ADDR. The control circuit 500 may provide the control signals CONs and the row address R_ADDR to the address decoder 200 and provide the column address C_ADDR to the data input/output circuit 400.

The address decoder 200 may be connected to the memory cell array 100 through the string selection line SSL, the plurality of word lines WLs, and the ground selection line GSL.

In the write operation mode and the read operation mode, the address decoder 200 determines one of the word lines WLs to a selected word line and the other word lines to unselected word lines based on the row address R_ADDR provided from the control circuit 500.

The address decoder 200 may receive word line voltages VWLs for operation of the nonvolatile memory device 10 from a voltage generator disposed in the nonvolatile memory device 10 or out of the nonvolatile memory device 10. The word line voltages VWLs may be applied to the word lines WLs through the address decoder 200.

The page buffer circuit 300 may be connected to the memory cell array 100 through the plurality of bit lines BLs.

The page buffer circuit 300 may include a plurality of page buffers. In some exemplary embodiments, one page buffer may be connected to one bit line. In some exemplary embodiments, one page buffer may be connected to two or more bit lines.

The page buffer circuit 300 may temporarily store data to be written in a selected page or data read out from the selected page.

The data input/output circuit 400 may be connected to the page buffer circuit 300 through data lines DL.

During the write operation, the data input/output circuit 400 may receive write data DATA from the SSD controller 20 and provide the write data DATA to the page buffer circuit 300 based on the column address C_ADDR received from the control circuit 500.

During the read operation, the data input/output circuit 400 may provide read data DATA, which are stored in the page buffer circuit 300, to the SSD controller 20 based on the column address C_ADDR received from the control circuit 500.

Hereinbefore, an example of the plurality of nonvolatile memory devices 10-1, 10-2, ..., 10-$k$ included in the SSD device 1200 of FIG. 1 is described with reference to FIGS. 2 to 4. However, exemplary embodiments are not limited thereto. According to exemplary embodiments, each of the plurality of nonvolatile memory devices 10-1, 10-2, ..., 10-$k$ may be implemented in different structures.

Figure 5A:
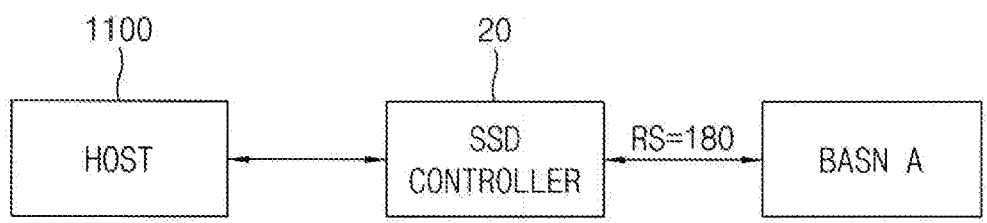
FIG. 5A is a conceptual diagram illustrating the example SSD device of FIG. 1 for supporting a single stream system.

FIG. 5A is a conceptual diagram illustrating the SSD device 1200 of FIG. 1 for supporting a single stream system.

Referring to FIGS. 1 to 5A, the SSD controller 20 may map the stream to the super block BASN. In FIG. 5A, the SSD controller 20 operates in the single stream system so that the stream may write data in a fixed super block BASN A.

Although the stream writes the data in the fixed single super block BASN in the present exemplary embodiment, the embodiments are not limited thereto. The single stream may use a plurality of the super blocks BASN. However, the single stream may use the single super block BASN at a specific point in time.

For example, in the embodiment of FIG. 5A, a single stream simultaneously uses resources RS of 180 of the SSD device 1200 to write the data to the super block BASN A. Herein, the resources RS mean any physical or logical resources to write the data to the super block BASN A. For example, the resources RS may be the number of the allocated ways to write the data to the super block BASN A or the number of the channels to write the data to the super block BASN A. The resources RS of 180 may be a merely relative number to compare to the resources RS1 to RS9 of the exemplary embodiment in FIG. 5B.

Figure 5B:
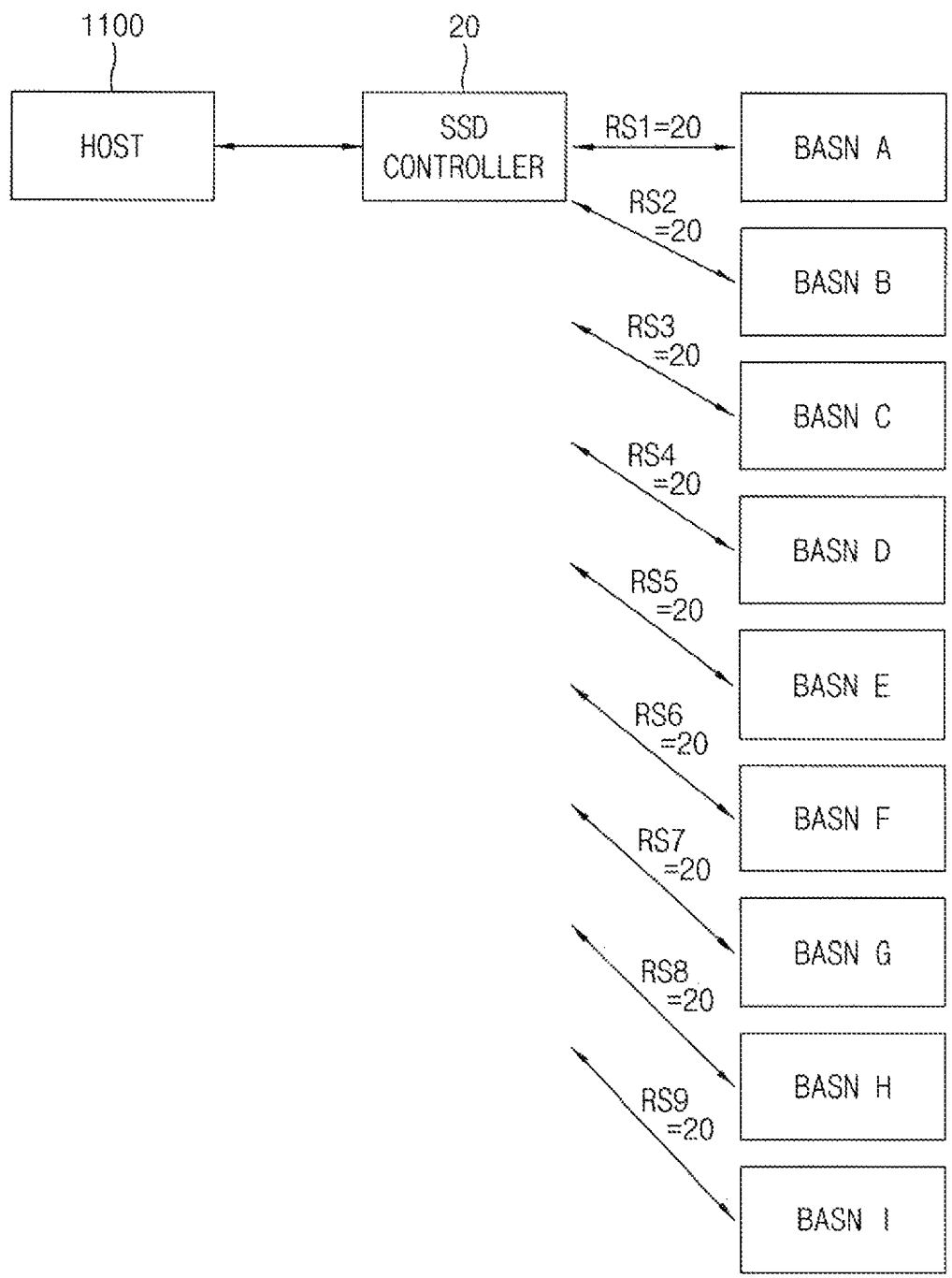
FIG. 5B is a conceptual diagram illustrating the example SSD device of FIG. 1 for supporting a multi stream system.

FIG. 5B is a conceptual diagram illustrating the SSD device 1200 of FIG. 1 for supporting a multi stream system.

Referring to FIGS. 1 to 5B, the SSD controller 20 may map the stream to the super block BASN. In FIG. 5B, the SSD controller 20 operates in the multi stream system so that the stream may write data in various super blocks BASN A, BASN B, ..., BASN I.

Although each of the streams corresponds to the single super block BASN in the present exemplary embodiment, the embodiment is not limited thereto. The single stream may correspond to the plurality of the super blocks BASN.

In the example of FIG. 5B, the SSD controller 20 supports nine streams. In addition, for convenience of explanation, it is assumed that each single stream uses a single super block BASN. For example, a first stream writes data to a first super block BASN A. A second stream writes data to a second super block BASN B. A third stream writes data to a third super block BASN C. A fourth stream writes data to a fourth super block BASN D. A fifth stream writes data to a fifth super block BASN E. A sixth stream writes data to a sixth super block BASN F. A seventh stream writes data to a seventh super block BASN G. An eighth stream writes data to an eighth super block BASN H. A ninth stream writes data to a ninth super block BASN I.

If the same number of resources is allocated for each stream, each of the first to ninth streams may use the resources RS1 to RS9 of 20. For example, when each of the resources RS1 to RS9 may have allocated 20 resources, the total number of resources is 180.

In FIG. 5B, when the variation of the workloads among the streams is small, the operational performance of the SSD device 1200 may not be significantly reduced. However, when the variation of the workloads among the streams is larger, the operation performance of the SSD device may be significantly reduced.

For example, the workload of the stream may be determined by the number of write commands. When the number of the write commands of the stream is great, the workload of the stream is great. When the number of the write commands of the stream is fewer, the workload of the stream is smaller.

Figure 6:
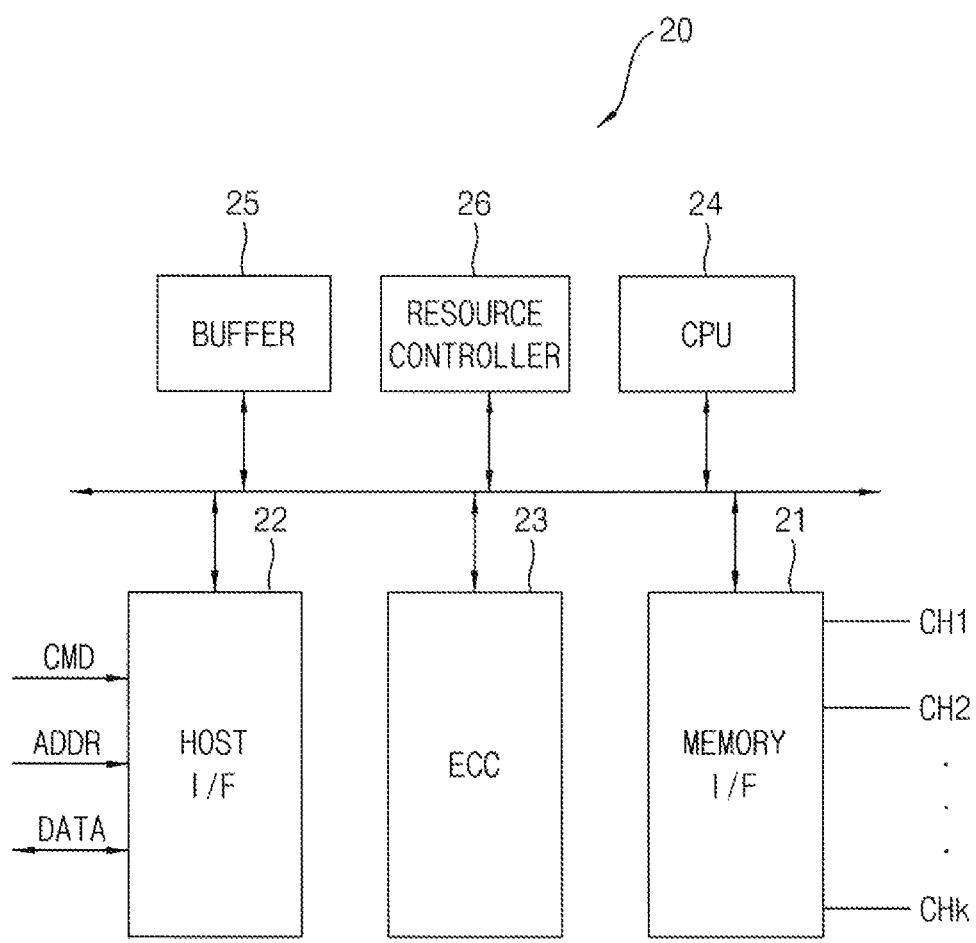
FIG. 6 is a block diagram illustrating an example of a SSD controller of FIG. 1.

FIG. 6 is a block diagram illustrating an example of the SSD controller 20 of FIG. 1.

Referring to FIG. 6, the SSD controller 20 may include a memory interface (I/F) 21, a host interface (I/F) 22, an error correction circuit (ECC) 23, a central processing unit (CPU) 24, a buffer memory 25 and a resource controller 26. The memory interface 21, the host interface 22, the ECC 23, the CPU 24, the buffer memory 25, and the resource controller 26 may be communicatively coupled with one another by a bus (not illustrated), and may transmit and/or receive data and instructions to/from one another via the bus.

The memory interface 21 may distribute the data DATA received from the buffer memory 25 to the plurality of channels CH1, CH2, . . . , CHk. In addition, the memory interface 21 may transmit the data DATA read from the nonvolatile memory devices 10-1, 10-2, . . . , 10-k to the buffer memory 25. The memory interface 21 may transmit/receive the DATA to/from the plurality of channels CH1, CH2, . . . , CHk and the buffer memory 25 via the bus.

In some exemplary embodiments, the memory interface 21 may use a flash memory interface method. In this case, the SSD controller 20 may perform the write operation, the read operation, and the erase operation according to the flash memory interface method.

The host interface 22 may be connected to the host 1100 to interface the SSD device 1200 with the host 1100 according to a protocol of the host 1100. For example, the host interface 22 may communicate the command signal CMD, the address signal ADDR, and the data DATA with the host 1100 using various interface protocols, such as, for example, a universal serial bus (USB), a small computer system interface (SCSI), a peripheral component interconnect-express (PCI-E), a parallel advanced technology attachment (PATA), a serial advanced technology attachment (SATA), a serial-attached SCSI (SAS), and so on. In addition, the host interface 22 may perform disk emulation for supporting the host 1100 to recognize the SSD device 1200 a hard disk drive (HDD) device.

The buffer memory 25 may temporarily store the data DATA provided from the host 1100 and the data DATA read from the plurality of nonvolatile memory devices 10-1, 10-2, . . . , 10-k. In some exemplary embodiments, the buffer memory 25 may include a volatile memory device, such as a dynamic random access memory (DRAM), a static random access memory (SRAM), etc. In some exemplary embodiments, the buffer memory 25 may be a tightly-coupled memory (TCM).

The error correction circuit 23 may generate an error correction code using the data DATA written on the plurality of nonvolatile memory devices 10-1, 10-2, . . . , 10-k. The error correction code may be stored in a spare area of the plurality of nonvolatile memory devices 10-1, 10-2, . . . , 10-k. After that, the error correction circuit 23 may detect an error of the data DATA read from the plurality of nonvolatile memory devices 10-1, 10-2, . . . , 10-k and correct the detected error using the error correction code.

The CPU 24 may analyze and process the command signal CMD and the address signal ADDR received from the host 1100 via the host interface 22. The CPU 24 may communicate with the host 1100 through the host interface 22, and control the plurality of nonvolatile memory devices 10-1, 10-2, . . . , 10-k through the memory interface 21. The CPU 24 may control operations of the plurality of nonvolatile memory devices 10-1, 10-2, . . . , 10-k based on a firmware for driving the SSD device 1200.

The resource controller 26 determines the workloads of the streams, and adjusts the resources of the SSD device 1200 based on the workloads of the streams. The workload for the individual streams may be a percentage of the total workload. The resource of the SSD device 1200 refers to the resource for writing the data DATA to the nonvolatile memory devices by the SSD controller 20.

In some exemplary embodiments, the resource controller 26 may adjust a size of the buffer memory 25 allocated for the streams based on the workloads of the streams. For example, when a workload of a stream is larger, the resource controller 26 may allocate more of the buffer memory 25 for processing the streams. And, when a workload of a stream is smaller, the resource controller 26 may allocate less of the buffer memory 25 for processing the streams. A first resource may refer to a first portion of the memory buffer 25, and a second resource may refer to a second portion of the memory buffer 25.

In some exemplary embodiments, the resource controller 26 may adjust a size of the volatile memory device 40 allocated for the streams based on the workloads of the streams. For example, when a workload of a stream is larger, the resource controller 26 may allocate more of the volatile memory device 40 for processing the streams. And, when a workload of a stream is smaller, the resource controller 26 may allocate less of the volatile memory device 40 for processing the streams. The volatile memory device 40 may be disposed out of the SSD controller 20 and may be connected to the SSD controller 20.

Figure 7B:
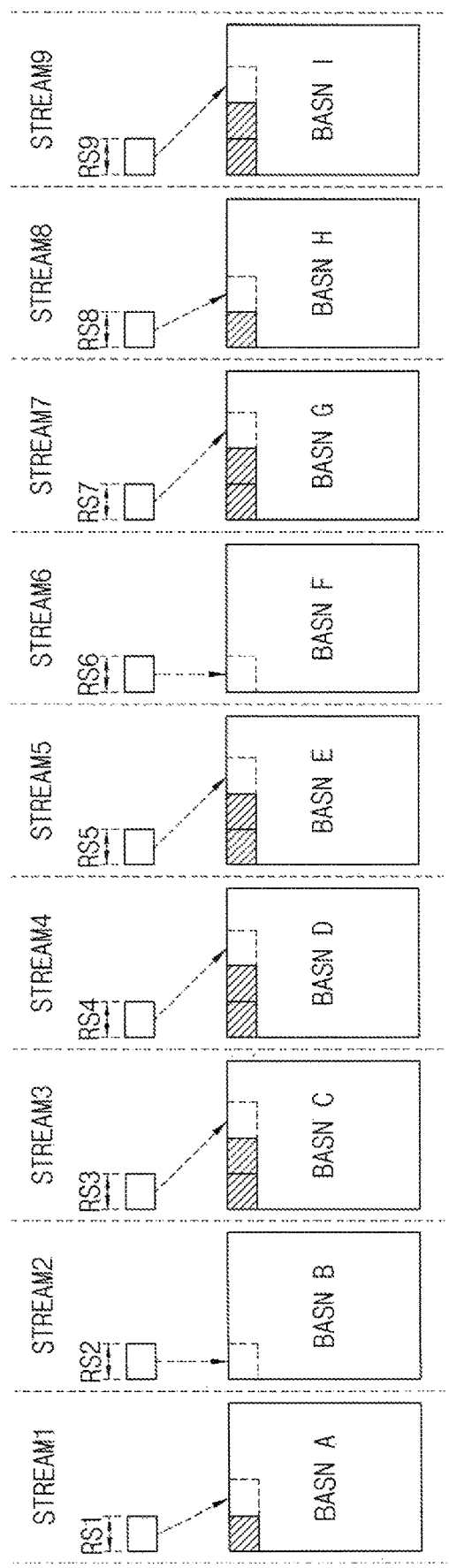
FIG. 7B is a conceptual diagram illustrating an operation of the example SSD device of FIG. 1 when the same resources are allocated to the streams.

FIG. 7A is a table illustrating an example of expected performance of the SSD device 1200 of FIG. 1 when the same number of resources are allocated to individual streams. FIG. 7B is a conceptual diagram illustrating an example operation of the SSD device 1200 of FIG. 1 when the same number of resources are allocated to the individual streams.

Referring to FIGS. 7A and 7B, the SSD device 1200 supports nine streams, the workloads of the streams are not the same as one another (e.g., the proportion of the total workload performed by each stream is different). For example, the first stream has a workload of 10% of the overall workload for all the streams. The second stream has a workload of 3%. The third stream has a workload of 25%. The fourth stream has a workload of 50%. The fifth stream has a workload of 2%. The sixth stream has a workload of 5%. The seventh stream has a workload of 1%. The eighth stream has a workload of 1%. The ninth stream has a workload of 3%.

In FIG. 7A, the number of the ways (e.g. two) allocated to each of the streams is the same regardless of the variation of the workloads among the streams. In this case, the number of resources RS1 to RS9 used by each of the streams is the same as one another. Herein, the number of the nonvolatile memory devices connected to the single channel may be defined as the way.

The fourth stream has the relatively greatest workload, but the number of the ways to write data simultaneously is not sufficient so that the write speed may be reduced in the fourth stream.

Even though the seventh stream and the eight stream have the relatively little workload, the number of the ways to write data simultaneously in the seventh stream and the eight stream is the same as the number of the ways in the fourth stream. As a result, the resources of the SSD device 1200 may be inefficiently used.

Figure 8B:
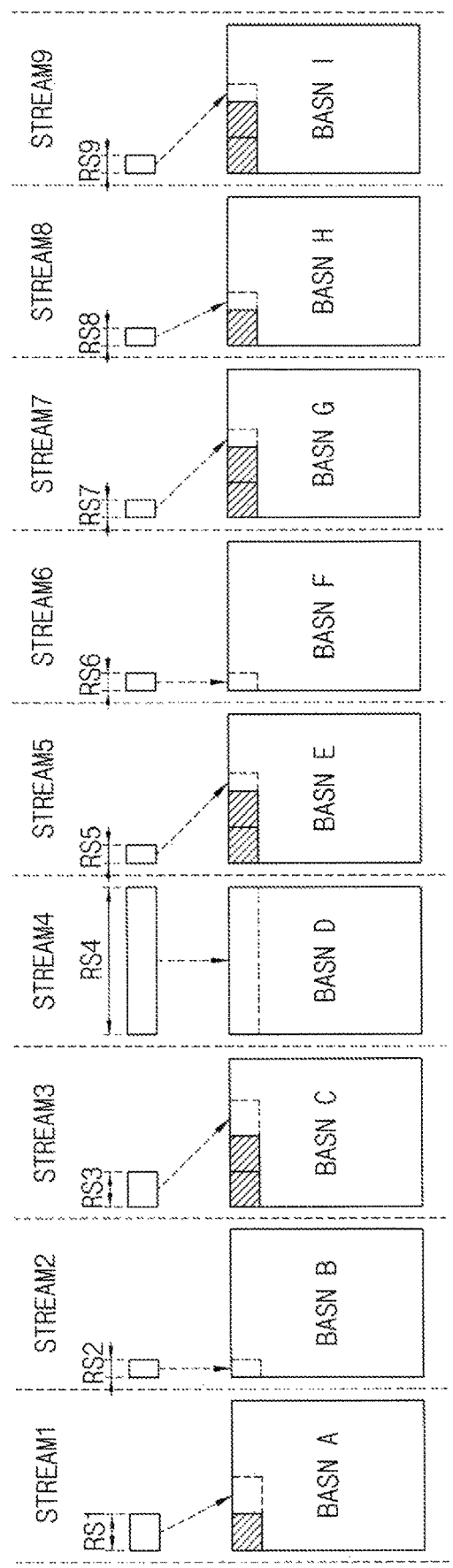
FIG. 8B is a conceptual diagram illustrating an operation of the example SSD device of FIG. 1 when the resources are allocated to the streams according to workloads of the streams.

FIG. 8A is a table illustrating an expected performance of the SSD device of FIG. 1 when the resources are allocated to the streams according to workloads of the streams. FIG. 8B is a conceptual diagram illustrating an operation of the SSD device 1200 of FIG. 1 when the resources are allocated to the streams according to workloads of the streams.

Referring to FIGS. 8A and 8B, the SSD device 1200 supports nine streams, the workloads of the streams are not the same as one another (e.g., the proportion of the total workload performed by each stream is different). For example, the first stream has a workload of 10%. The second stream has a workload of 3%. The third stream has a workload of 25%. The fourth stream has a workload of 50%. The fifth stream has a workload of 2%. The sixth stream has a workload of 5%. The seventh stream has a workload of 1%. The eighth stream has a workload of 1%. The ninth stream has a workload of 3%.

In FIG. 8A, the number of the ways allocated to the streams are different from one another according to the variation of the workloads among the streams. In this case, the resources RS1 to RS9 used by the streams are different from one another. The SSD controller 20 may allocate the number of the ways of the super block in proportion to the workload of the stream.

For example, two ways are allocated to each of the first and third streams respectively having the workloads of 10% and 25%. One way is allocated to each of the second, fifth, sixth, seventh, eighth and ninth streams respectively having the workloads of 3%, 2%, 5%, 1%, 1% and 3%. Eight ways are allocated to the fourth stream having the workload of 50%.

In the present exemplary embodiment, the number of ways allocated to write data simultaneously of the fourth stream, which has the relatively greater workload, is increased from two to eight, so that the write speed may be increased in the fourth stream.

The number of ways allocated to write data simultaneously of the seventh and eighth streams, which have the relatively smaller workload, is decreased from two to one, so that the resources of the SSD device 1200 may be efficiently used.

The total number of the ways initially allocated to the nine streams in FIG. 8A is the same as the total number of the ways allocated to the nine streams in FIG. 7A. In FIG. 7A, two ways are respectively allocated to all of the streams regardless of the variation of the workloads among the streams. In FIG. 8A, however, the number of ways allocated to each stream is changed, such that the different numbers of the ways are allocated to the streams according to the workloads of the streams. In some embodiments, the dynamic reallocation of resources may improve the speed at which the work is processed. For example, the total expected performance is 760 Mbps in FIG. 7A, and the total expected performance is 865.5 Mbps in FIG. 8A.

FIG. 9 is a table illustrating a relationship between the resource of the SSD device 1200 of FIG. 1 and allocated ways.

Referring to FIG. 9, in some exemplary embodiments, the resource of the SSD device 1200 may correspond to the number of the ways of the super block BASN allocated to the stream. Herein, for example, the resource of the SSD device 1200 to write the data to the super block BASN may be defined as the number of the ways of the super block BASN allocated to the stream.

For example, the SSD controller 20 may allocate the number of the ways of the super block BASN in proportion to the workload of the stream.

As illustrated in FIG. 9, if it is supposed that the number of the ways is two when the resource is twenty, then the number of the ways is one when the resource is ten, and the number of the ways is eight when the resource is eighty.

Referring to FIGS. 1, 8A, 8B, and 9, the super block may include a plurality of blocks. The number of the blocks included in the super block may be determined by a multiplication of the number of the channels and the number of the ways (i.e., the number of the nonvolatile memory device connected to the single channel). When the number of the channels is sixteen and the number of the ways is eight, the super block may include 128 blocks.

If all of the sixteen channels are activated in FIG. 8A and two ways are allocated to the stream, the stream may simultaneously write data to 32 blocks.

If all of the sixteen channels are activated in FIG. 8A and eight ways are allocated to the stream, the stream may simultaneously write data to 128 blocks.

For example, referring to FIG. 8B, the data of streams that are allocated two ways (i.e., Stream1 and Stream3) may be simultaneously written to 32 blocks in the corresponding super blocks (i.e., BASN A and BASN C, respectively). The data of streams that are allocated one way (i.e., Stream2, Stream5, Stream6, Stream7, Stream8, and Stream9) may be simultaneously written to 16 blocks in the corresponding super blocks (i.e., BASN B, BASN E, BASN F, BASN G, BASN H, and BASN I, respectively). And the data of streams that are allocated eight ways (i.e., Stream4) may be simultaneously written to 128 blocks in the corresponding super block (i.e., BASN D).

FIG. 10 is a table illustrating a relationship between the resource of the SSD device 1200 of FIG. 1 and numbers of allocated channels.

Referring to FIG. 10, in some exemplary embodiments, the resource of the SSD device 1200 may mean the number of the channels allocated to the stream. Herein, for example, the resource of the SSD device 1200 to write the data to the super block BASN may be defined as the number of the channels allocated to the stream.

For example, the SSD controller 20 may allocate the number of the channels in proportion to the workload of the stream.

If it is supposed that the number of the channels is four when the resource is twenty, then the number of the channels is two when the resource is ten, and the number of the channels is 16 when the resource is eighty.

Referring to FIGS. 1 and 10, the super block BASN may include a plurality of blocks. The number of the blocks included in the super block BASN may be determined by a multiplication of the number of the channels and the number of the ways which mean the number of the nonvolatile memory device connected to the single channel. When the number of the channels is sixteen and the number of the ways is eight, the super block BASN may include 128 blocks.

In some exemplary embodiments, when the eight ways are all activated and the number of the allocated channels is four, the stream may simultaneously write data to 32 blocks.

In some exemplary embodiments, when the eight ways are all activated and the number of the allocated channels is sixteen, the stream may simultaneously write data to 128 blocks.

Figure 11:
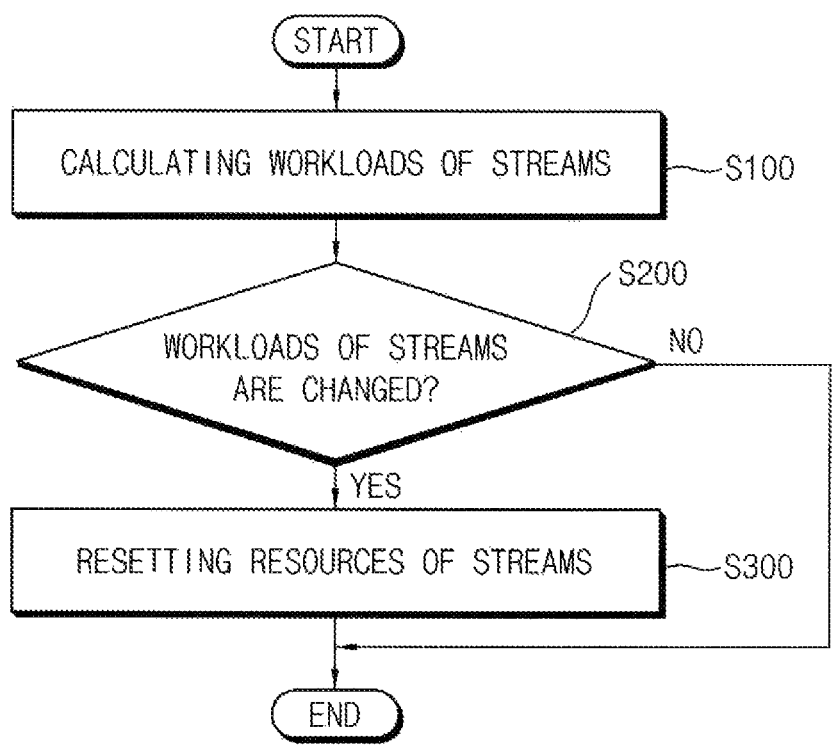
FIG. 11 is a flowchart illustrating an example operation of the SSD controller of FIG. 6.

FIG. 11 is a flowchart illustrating an operation of the SSD controller 20 of FIG. 6.

Referring to FIGS. 1, 6, 8A, 8B and 11, the resource controller 26 may periodically calculate the workloads of the streams (step S100). In some embodiments, the resource controller 26 may map a plurality of streams to a super block BASN, and calculate the workloads of the mapped streams.

The resource controller 26 may determine whether the workloads of the streams are changed or not (step S200).

For example, when the workloads of the streams are changed, the resource controller 26 may reset the resources of the streams (step S300). Resetting or re-allocating the resources of the streams may include, for example, changing the numbers (e.g., increasing or decreasing) of resources for one or more of the streams, maintaining the numbers of resources for one or more of the streams, or a combination thereof.

For example, when the workloads of the streams are not changed, the resource controller 26 may maintain the resources of the streams.

According to the present exemplary embodiment, the SSD controller 20 of the SSD device 1200 calculates the workloads of the streams and adjusts or re-allocates the resources of the SSD device 1200 according to the workloads of the streams so that the SSD device 1200 may support a multi stream system with reducing performance deterioration. For example, the resource of the SSD device 1200 may be a size of the buffer memory disposed in the SSD controller 20. For example, the resource of the SSD device 1200 may be a size of the volatile memory device disposed out of the SSD controller 20.

Figure 12:
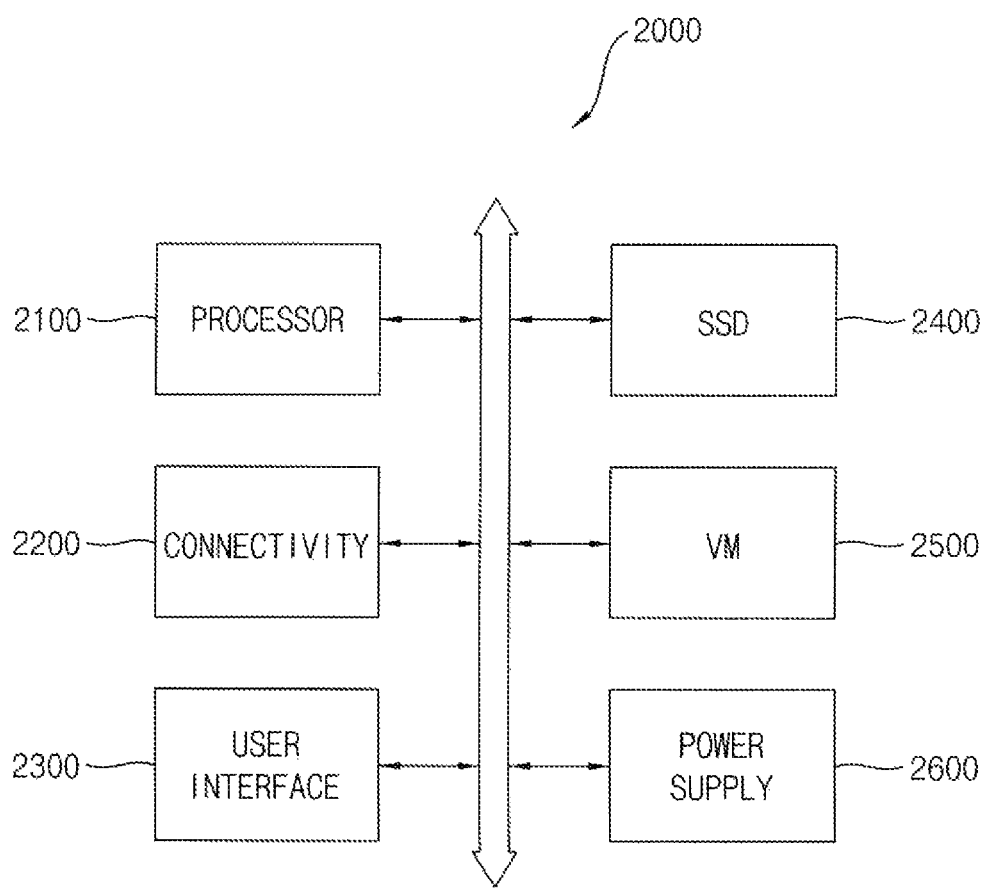
FIG. 12 is a block diagram illustrating a computing system according to an exemplary embodiment.

FIG. 12 is a block diagram illustrating a computing system according to an exemplary embodiment.

Referring to FIG. 12, the computing system 2000 includes a processor 2100, a connectivity circuit 2200, a user interface 2300, the SSD device 2400 which is explained referring to FIGS. 1 to 11 (e.g., SSD device 1200), a volatile memory device VM 2500, and a power supply 2600.

In some embodiments, the computing system 2000 may be any kind of computing systems, such as a desktop computer, a laptop computer, a server computer, etc.

The processor 2100 may execute applications, such as a web browser, a game application, a video player, etc. The connectivity circuit 2200 may perform wired or wireless communication with an external device. The power supply 2600 may provide a supply a power voltage to the computing system 2000. The SSD device 2400 may store a boot image for booting the computing system 2000. The volatile memory device 2500 may store data processed by the processor 2100, or may operate as a working memory. The user interface 2300 may include at least one input device, such as a keypad, a touch screen, etc., and at least one output device, such as a speaker, a display device, etc.

The disclosed embodiments may be used to any kinds of electronic devices including the SSD device. For example, the embodiments may be applied to the laptop computer, the server computer, etc. including the SSD device.

The foregoing is illustrative and is not to be construed as limiting thereof. Although a few example embodiments have been described, those skilled in the art will readily appreciate that many modifications are possible in the example embodiments without materially departing from the novel teachings and advantages of the present concepts. Accordingly, all such modifications are intended to be included within the scope of the concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A solid state drive (SSD) device comprising:
a plurality of nonvolatile memory devices; and
an SSD controller connected to the plurality of nonvolatile memory devices and configured to calculate workloads for each of a plurality of streams received by the SSD device, allocate resources of the SSD device based on the workloads calculated for each of the plurality of streams, and control operations of the nonvolatile memory devices,
wherein the workloads are calculated by the SSD controller of the SSD device.

2. The SSD device of claim 1, wherein the workloads of the plurality of streams are determined based on a number of write commands.

3. The SSD device of claim 2, wherein when a first stream of the plurality of streams has a first workload and a second stream of the plurality of streams has a second workload different from the first workload, the SSD controller allocates to the first stream a first resource and allocates to the second stream a second resource different from the first resource.

4. The SSD device of claim 3, wherein when the first workload of the first streams greater than the second workload of the second stream, the SSD controller allocates the second resource greater than the first resource.

5. The SSD device of claim 1, wherein the SSD controller is further configured to map the plurality of streams to a super block, and
wherein the super block is a set of memory blocks which corresponds to an erasing unit of the plurality of nonvolatile memory devices.

6. The SSD device of claim 5, further comprising:
a plurality of channels connecting the nonvolatile memory devices to the SSD controller,
wherein memory blocks of the set of memory blocks of the super block are connected to different channels of the plurality of channels.

7. The SSD device of claim 5, wherein the SSD controller is configured to allocate a number of ways of the super block in proportion to the workloads of the streams.

8. The SSD device of claim 5, further comprising:
a plurality of channels connecting the nonvolatile memory devices to the SSD controller,
wherein the SSD controller is configured to allocate a number of the channels in proportion to the workloads of each of the plurality of streams.

9. The SSD device of claim 1, wherein the SSD controller comprises:
a buffer memory configured to temporarily store received data received from a host and read data read from the nonvolatile memory devices; and a resource controller configured to calculate the workloads of the plurality of streams and to adjust the resources of the SSD device based on the workloads of the plurality of streams.

10. The SSD device of claim 9, wherein the resource controller is configured to adjust a size of the buffer memory allocated to the streams according to the workloads of the streams.

11. The SSD device of claim 9, wherein the buffer memory is a tightly-coupled memory (TCM).

12. The SSD device of claim 9, wherein the resource controller is configured to periodically calculate the workloads of the plurality of streams, to reset the resources for the plurality of streams when the workloads of the plurality of streams are changed, and to maintain the resources for the streams when the workloads of the plurality of streams are not changed.

13. The SSD device of claim 9, further comprising:
a volatile memory device disposed external to the SSD controller and connected to the SSD controller,
wherein the volatile memory device is configured to temporarily store the received data received from the host and the read data read from the nonvolatile memory devices.

14. The SSD device of claim 13, wherein the resource controller is configured to adjust a proportion of the volatile memory device allocated to one or more of the plurality of streams according to the workloads of the plurality of streams.

15. A storage system comprising:
a solid state drive (SSD) device configured to store data; and
a host configured to provide a power voltage to the SSD device and to control an operation of the SSD device,
wherein the SSD device comprises:
a plurality of nonvolatile memory devices; and
an SSD controller configured to calculate workloads for each of a plurality of streams received by the SSD device, allocate a resource of the SSD device based on the workloads calculated for each of the plurality of streams, and control operations of the nonvolatile memory devices, and
wherein the workloads are calculated by the SSD controller of the SSD device.

16. A method for multi stream processing in a solid state drive (SSD) device comprising an SSD controller, the method comprising:
mapping a plurality of streams received by the SSD device to a super block;
calculating, by the SSD controller, workloads for each of the plurality of the streams; and
allocating resources of the SSD device based on the workloads calculated by the SSD controller of the SSD device for each of the plurality of the streams,
wherein the super block is a set of memory blocks corresponding to an erasing unit of a plurality of nonvolatile memory devices.

17. The method of claim 16, wherein when a first stream of the plurality of the streams has a first workload and a second stream of the plurality of the streams has a second workload different from the first workload, allocating the resources includes:
allocating a first resource to the first stream; and
allocating a second resource to the second stream,
wherein the first resource is different than the second resource.

18. The method of claim 16, further comprising:
determining if the workloads of each of the plurality of the streams are changed from a prior workload calculation.

19. The method of claim 18, further comprising:
reallocating the resources of the SSD device based on the workloads calculated for each of the plurality of the streams.

20. The method of claim 16, wherein allocating the resources includes:
allocating a number of channels in proportion to the workloads of the plurality of the streams.

* * * * *